US008438999B2

(12) United States Patent
Hardi et al.

(10) Patent No.: US 8,438,999 B2
(45) Date of Patent: May 14, 2013

(54) SYSTEMS AND METHODS FOR ANIMAL CONTAINMENT, TRAINING, AND TRACKING

(75) Inventors: Jason A. Hardi, Raleigh, NC (US); James M. O'Brien, III, Raleigh, NC (US)

(73) Assignee: Titan Pet Products, Inc., Raleigh, NC (US)

( * ) Notice: Subject to any disclaimer, the term of this patent is extended or adjusted under 35 U.S.C. 154(b) by 0 days.

(21) Appl. No.: 12/880,012

(22) Filed: Sep. 10, 2010

(65) Prior Publication Data

US 2011/0061605 A1 Mar. 17, 2011

Related U.S. Application Data

(60) Provisional application No. 61/241,866, filed on Sep. 12, 2009.

(51) Int. Cl.
*A01K 15/00* (2006.01)

(52) U.S. Cl.
USPC .......................... 119/718; 119/721; 119/859

(58) Field of Classification Search .................. 119/724, 119/712, 718, 719, 720, 721, 722, 723, 859; 367/139; 340/573.3; 455/507, 66.1, 3.06
See application file for complete search history.

(56) References Cited

U.S. PATENT DOCUMENTS

| | | | |
|---|---|---|---|
| 2,741,224 A | 12/1953 | Putnam | |
| 3,753,421 A | 8/1973 | Peck | |
| 3,823,691 A | 7/1974 | Morgan | |
| 4,180,013 A | 12/1979 | Smith | |
| 4,335,682 A | 6/1982 | Gonda et al. | |
| 4,539,937 A | 9/1985 | Workman | |
| 4,627,385 A | 12/1986 | Vinci | |

(Continued)

FOREIGN PATENT DOCUMENTS

| | | |
|---|---|---|
| EP | 0467489 A1 | 1/1992 |
| JP | 5172952 A | 7/1993 |
| NL | 8401142 A | 11/1985 |
| NL | 9000845 A | 11/1991 |

OTHER PUBLICATIONS

International Search Report and Written Opinion issued in corresponding International Patent Application No. PCT/US2010/048543 on May 26, 2011.

*Primary Examiner* — Rob Swiatek
*Assistant Examiner* — Lisa Tsang
(74) *Attorney, Agent, or Firm* — Vincent K. Gustafson; Jenkins, Wilson, Taylor & Hunt, P.A.

(57) ABSTRACT

Systems for containing, training, and tracking pets utilize electronic pet tags or collars, including IR reception and two-way RF communication. An aimable IR directional zone defining unit includes selectable different modes of operation relative to a pet collar or tag. A RF base station arranged to communicate with an pet collar or tar includes is arranged to automatically communicate with at least one terminal responsive to a receipt of a RF signal indicative of at least one of: condition of the pet, behavior of the pet, and proximity of the pet to the base station. The base station may further generate a user-perceptible alarm signal. A handheld remote controller adapted to communicate with the electronic pet collar or tag includes memory for digital media files, and an audio output element to deliver audible pet training instructions from the memory element.

23 Claims, 10 Drawing Sheets

U.S. PATENT DOCUMENTS

| | | | |
|---|---|---|---|
| 4,736,097 A | 4/1988 | Philipp | |
| 4,887,549 A | 12/1989 | Powell | |
| 4,967,695 A | 11/1990 | Giunta | |
| 5,009,192 A | 4/1991 | Burman | |
| 5,061,918 A | 10/1991 | Hunter | |
| 5,063,880 A | 11/1991 | Bouthillier | |
| 5,067,441 A | 11/1991 | Weinstein | |
| 5,121,711 A * | 6/1992 | Aine | 119/721 |
| 5,207,178 A | 5/1993 | McDade et al. | |
| 5,241,923 A | 9/1993 | Janning | |
| 5,335,626 A | 8/1994 | Calabrese | |
| 5,349,926 A | 9/1994 | McCarney et al. | |
| 5,353,744 A | 10/1994 | Custer | |
| 5,381,129 A | 1/1995 | Boardman | |
| 5,408,956 A | 4/1995 | Quigley | |
| 5,460,124 A | 10/1995 | Grimsley | |
| 5,465,687 A | 11/1995 | Custer | |
| 5,559,498 A | 9/1996 | Westrick et al. | |
| 5,601,054 A | 2/1997 | So | |
| 5,603,287 A | 2/1997 | Houck | |
| 5,606,936 A | 3/1997 | Davis | |
| 5,608,381 A | 3/1997 | McCarney et al. | |
| 5,640,932 A | 6/1997 | Bianco et al. | |
| 5,642,690 A | 7/1997 | Calabrese et al. | |
| 5,666,908 A | 9/1997 | So | |
| 5,799,618 A | 9/1998 | Van Curen et al. | |
| 5,815,077 A | 9/1998 | Christiansen | |
| 5,844,489 A | 12/1998 | Yarnall, Jr. et al. | |
| 5,852,403 A | 12/1998 | Boardman | |
| 5,872,516 A | 2/1999 | Bonge, Jr. | |
| 5,900,818 A | 5/1999 | Lemnell | |
| 5,915,332 A | 6/1999 | Young et al. | |
| 5,927,233 A | 7/1999 | Mainini et al. | |
| 6,019,066 A | 2/2000 | Taylor | |
| 6,043,748 A | 3/2000 | Touchton et al. | |
| 6,058,889 A | 5/2000 | Van Curen et al. | |
| 6,067,018 A | 5/2000 | Skelton et al. | |
| 6,079,367 A | 6/2000 | Stapelfeld et al. | |
| 6,163,261 A | 12/2000 | Westrick | |
| 6,166,643 A | 12/2000 | Janning et al. | |
| 6,167,843 B1 | 1/2001 | Kim | |
| 6,191,693 B1 | 2/2001 | Sangsingkeow | |
| 6,232,880 B1 | 5/2001 | Anderson et al. | |
| 6,263,836 B1 | 7/2001 | Hollis | |
| 6,269,776 B1 | 8/2001 | Grimsley et al. | |
| 6,360,698 B1 | 3/2002 | Stapelfeld et al. | |
| 6,415,742 B1 | 7/2002 | Lee et al. | |
| 6,431,121 B1 | 8/2002 | Mainini et al. | |
| 6,467,435 B2 | 10/2002 | Stapelfeld et al. | |
| 6,487,992 B1 | 12/2002 | Hollis | |
| 6,581,546 B1 | 6/2003 | Dalland et al. | |
| 6,600,422 B2 | 7/2003 | Barry et al. | |
| 6,657,544 B2 | 12/2003 | Barry et al. | |
| 6,720,879 B2 * | 4/2004 | Edwards | 340/573.3 |
| 6,782,847 B1 | 8/2004 | Shemesh et al. | |
| 6,799,537 B1 | 10/2004 | Liao | |
| 6,825,768 B2 | 11/2004 | Stapelfeld et al. | |
| 6,830,014 B1 | 12/2004 | Lalor | |
| 6,850,151 B1 | 2/2005 | Calhoun et al. | |
| 6,860,240 B2 | 3/2005 | Kim et al. | |
| 6,928,958 B2 | 8/2005 | Crist et al. | |
| 7,046,152 B1 | 5/2006 | Peinetti et al. | |
| 7,068,174 B1 | 6/2006 | Peinetti et al. | |
| 7,173,535 B2 | 2/2007 | Bach et al. | |
| 7,198,009 B2 | 4/2007 | Crist et al. | |
| 7,222,589 B2 | 5/2007 | Lee, IV et al. | |
| 7,252,051 B2 | 8/2007 | Napolez et al. | |
| 7,259,718 B2 | 8/2007 | Patterson et al. | |
| 7,267,082 B2 | 9/2007 | Lalor | |
| 7,278,376 B1 | 10/2007 | Peinetti et al. | |
| 7,312,711 B2 | 12/2007 | Fong et al. | |
| 7,343,879 B2 | 3/2008 | Gerig et al. | |
| 7,360,505 B2 | 4/2008 | Gerig et al. | |
| 7,409,924 B2 | 8/2008 | Kates | |
| 7,411,492 B2 | 8/2008 | Greenberg | |
| 7,434,541 B2 | 10/2008 | Kates | |
| 7,477,155 B2 | 1/2009 | Bach et al. | |
| 7,495,570 B1 | 2/2009 | Peinetti et al. | |
| 7,518,522 B2 | 4/2009 | So | |
| 7,559,291 B2 | 7/2009 | Reinhart | |
| 7,565,885 B2 | 7/2009 | Moore | |
| 7,712,438 B2 | 5/2010 | Reinhart | |
| 8,049,630 B2 * | 11/2011 | Chao Cheng et al. | 340/573.3 |
| 2002/0092478 A1 * | 7/2002 | Duncan et al. | 119/720 |
| 2007/0095304 A1 * | 5/2007 | Rosenberg et al. | 119/720 |
| 2007/0186870 A1 | 8/2007 | Westrick | |
| 2007/0204804 A1 | 9/2007 | Swanson et al. | |
| 2008/0035073 A1 | 2/2008 | Napolez et al. | |
| 2008/0036594 A1 | 2/2008 | Kates | |
| 2008/0134987 A1 | 6/2008 | Lee et al. | |
| 2008/0272908 A1 | 11/2008 | Boyd | |
| 2009/0000566 A1 * | 1/2009 | Kim | 119/721 |
| 2009/0013939 A1 | 1/2009 | Santiago et al. | |
| 2009/0031966 A1 | 2/2009 | Kates | |

\* cited by examiner

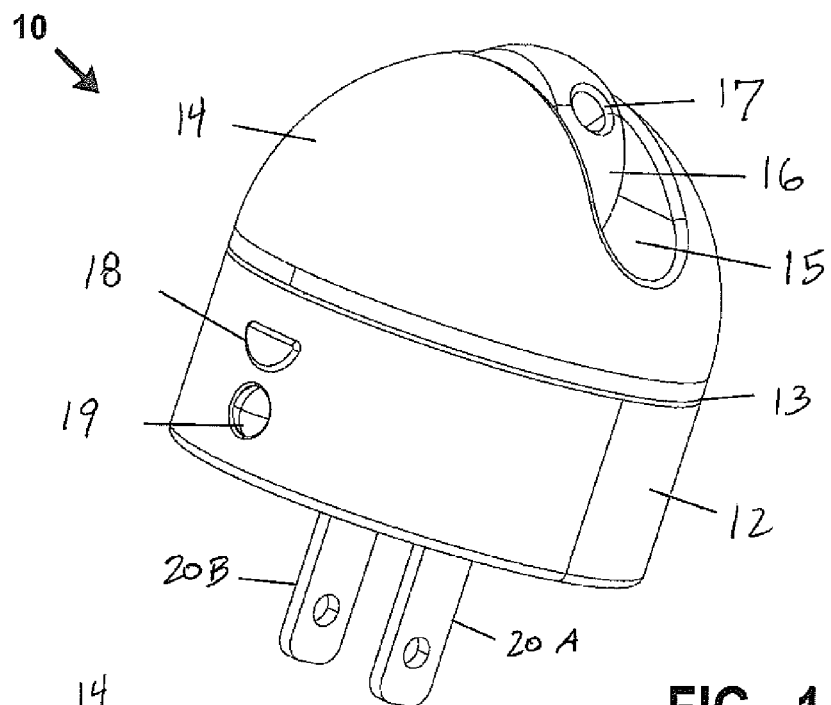
FIG._1A
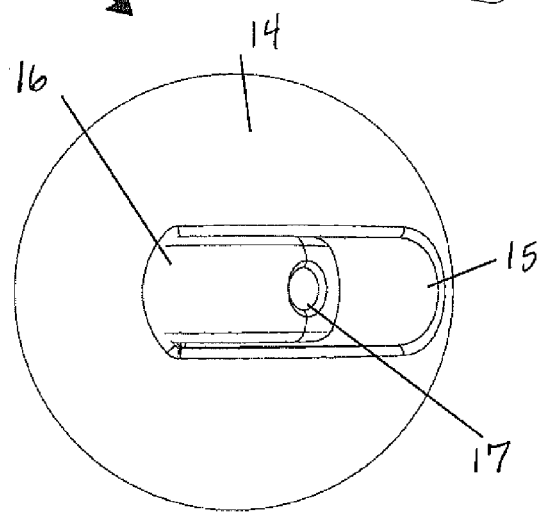
FIG._1B
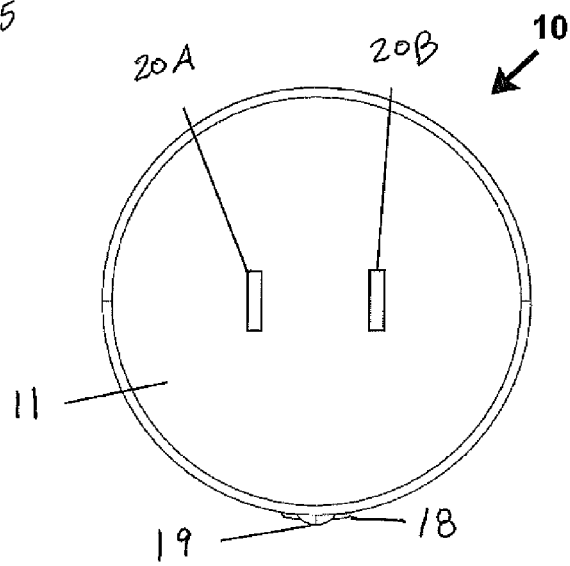
FIG._1C

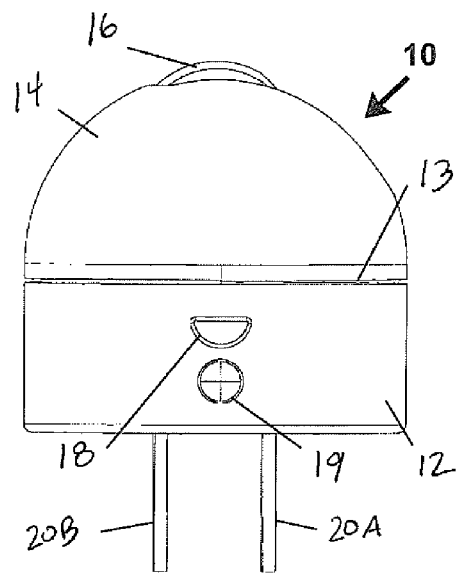
FIG._1D
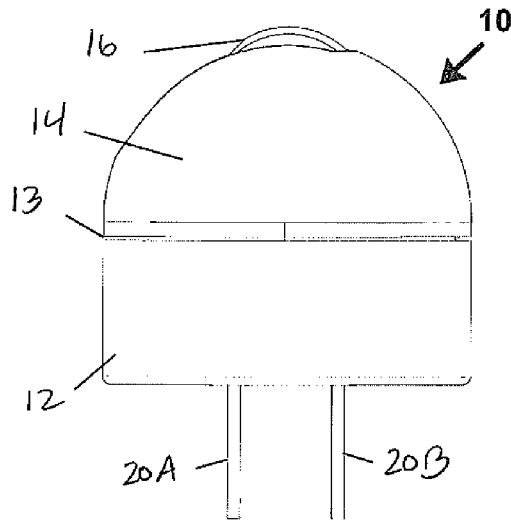
FIG._1E
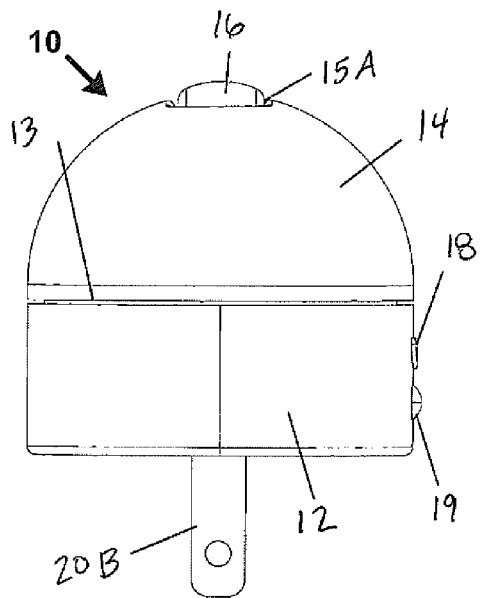
FIG._1F
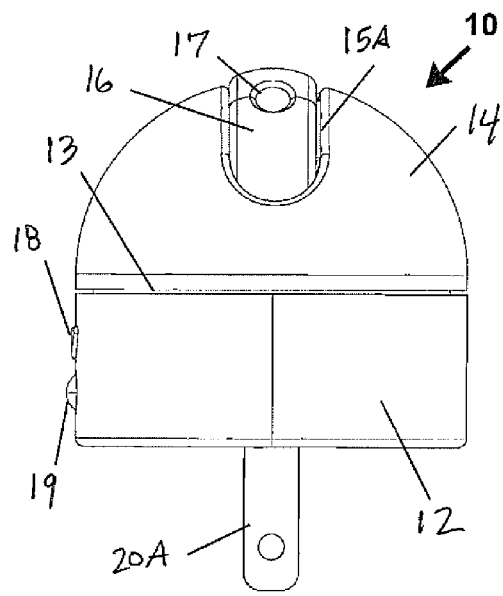
FIG._1G

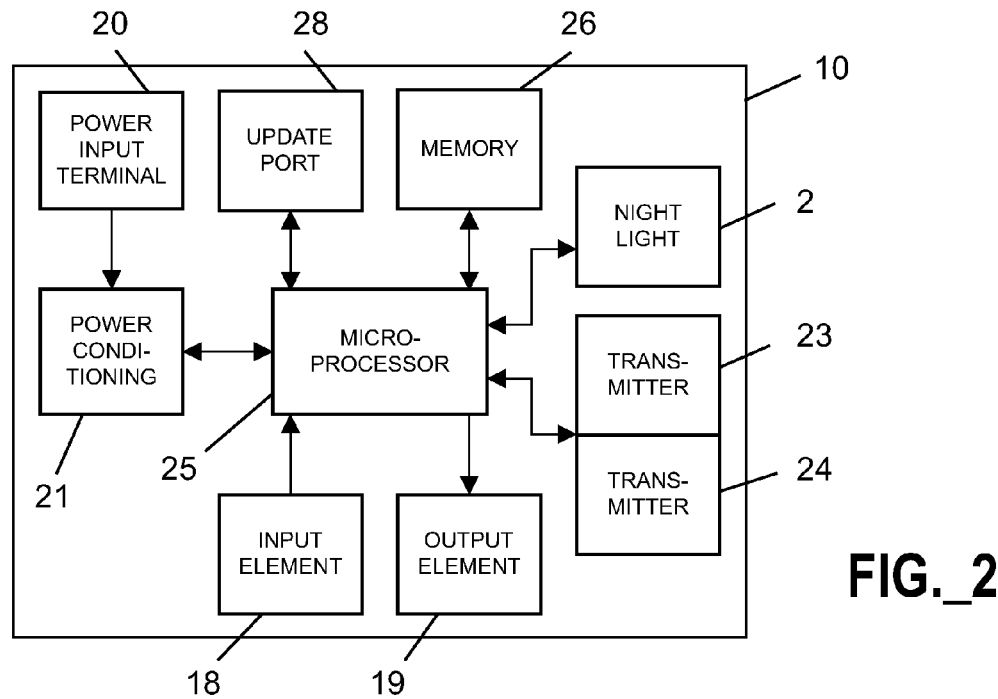
FIG._2
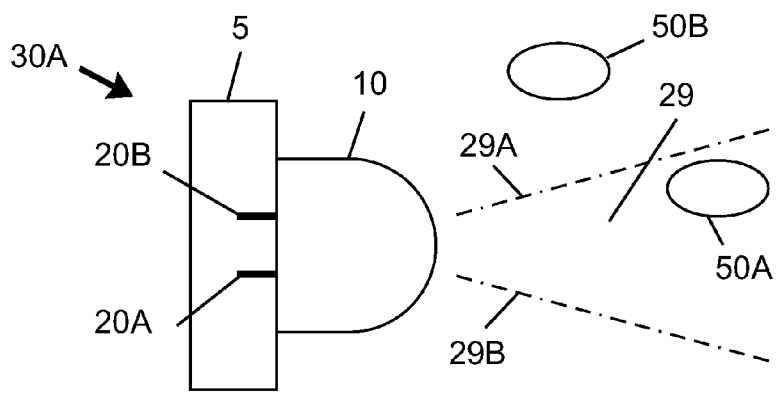
FIG._3
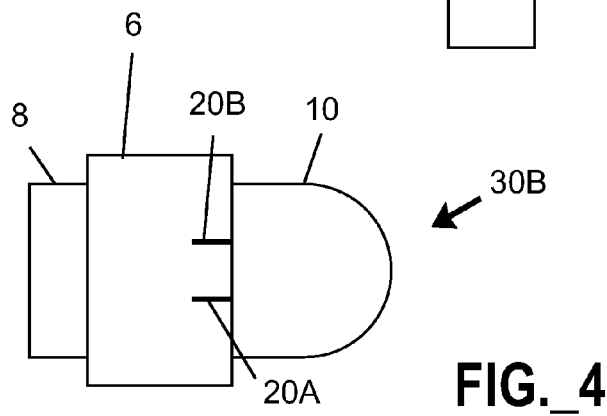
FIG._4

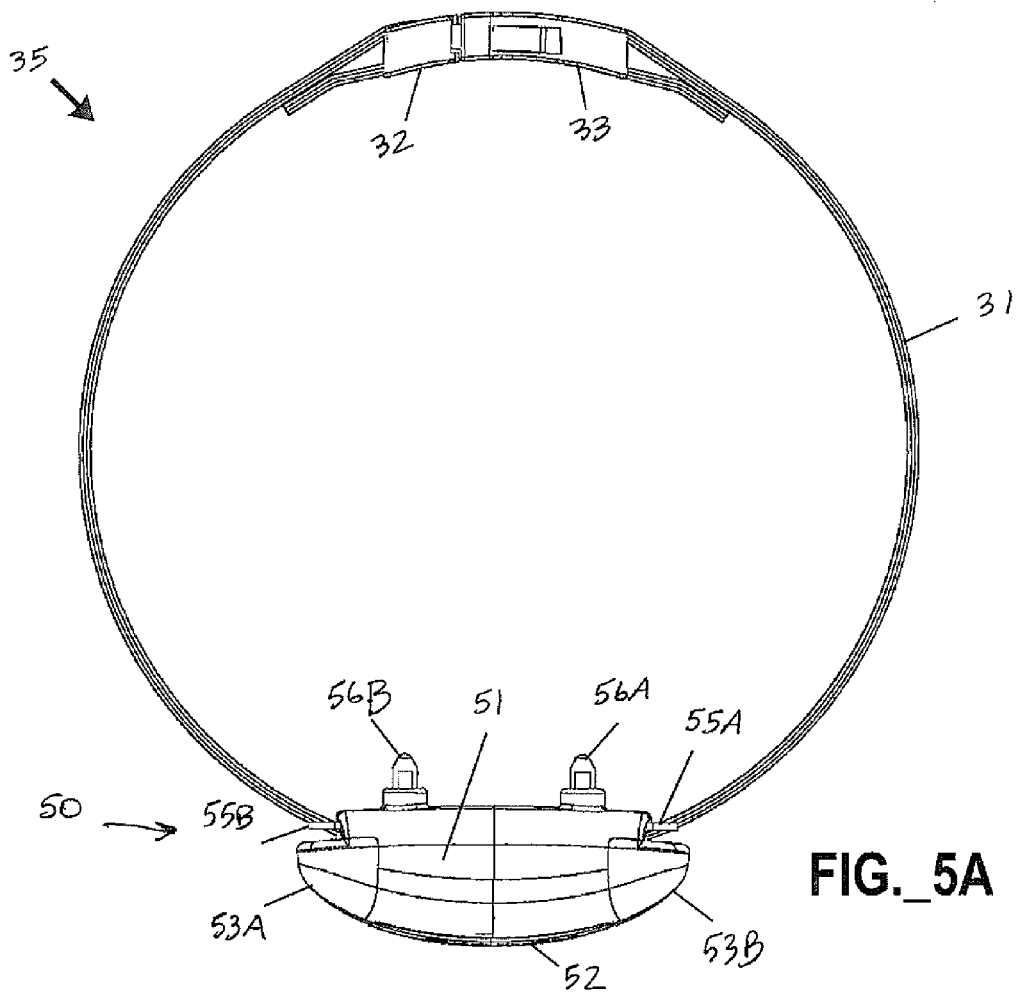
FIG._5A
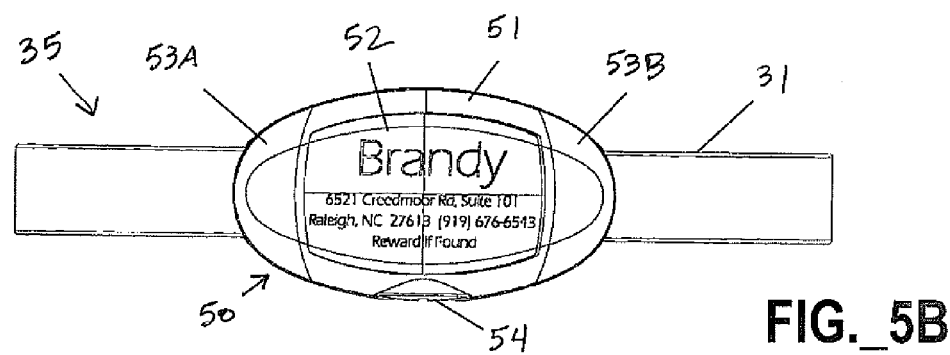
FIG._5B

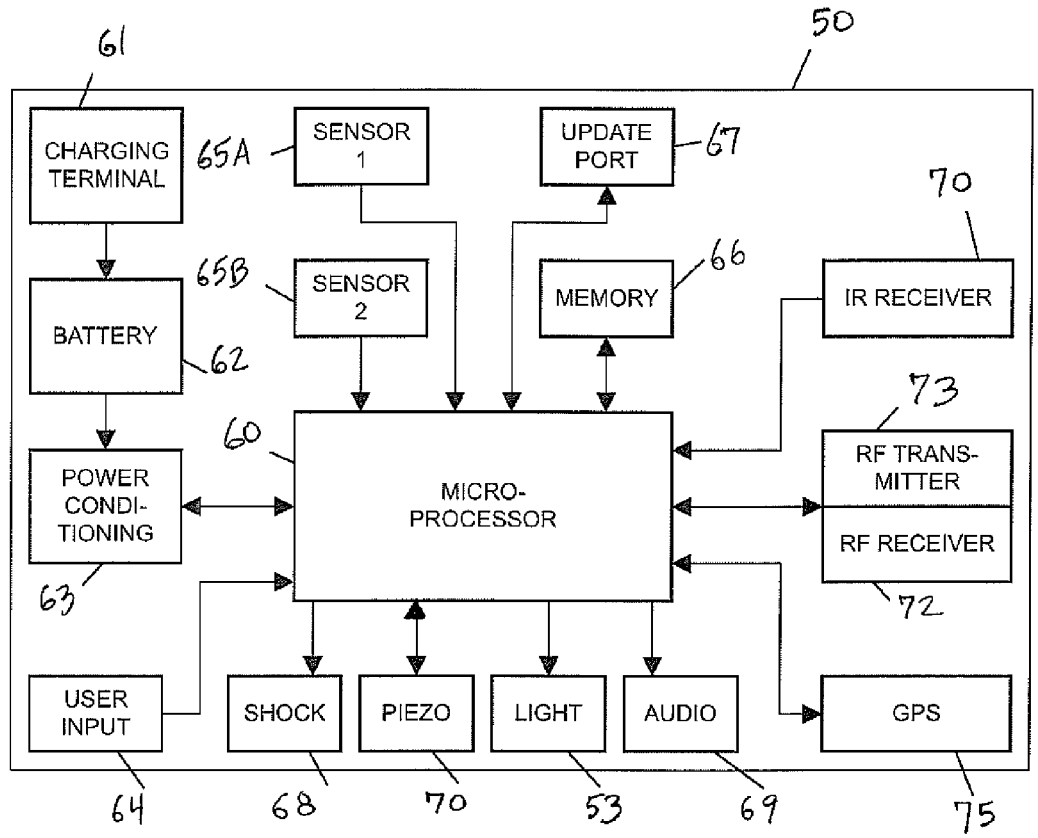
FIG._7
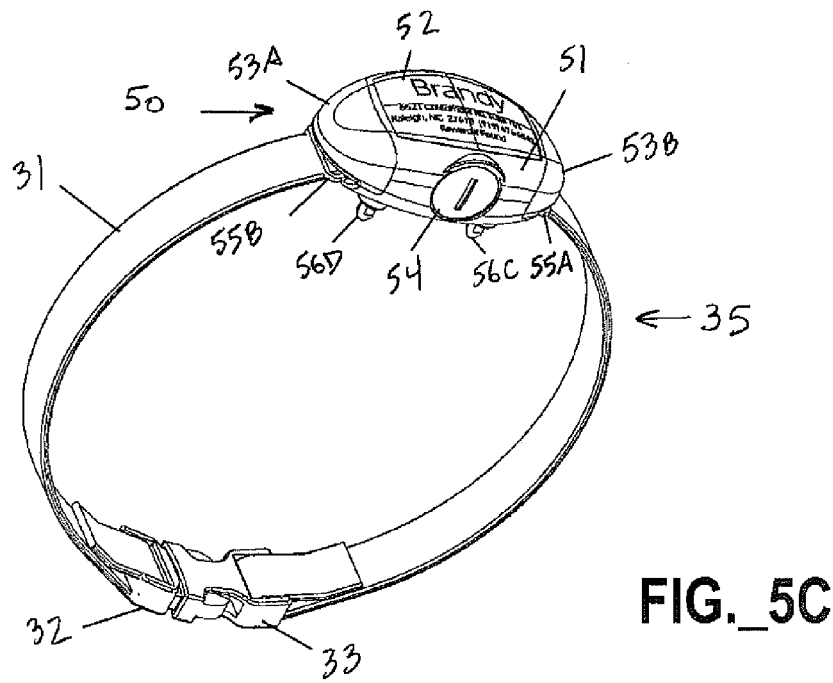
FIG._5C

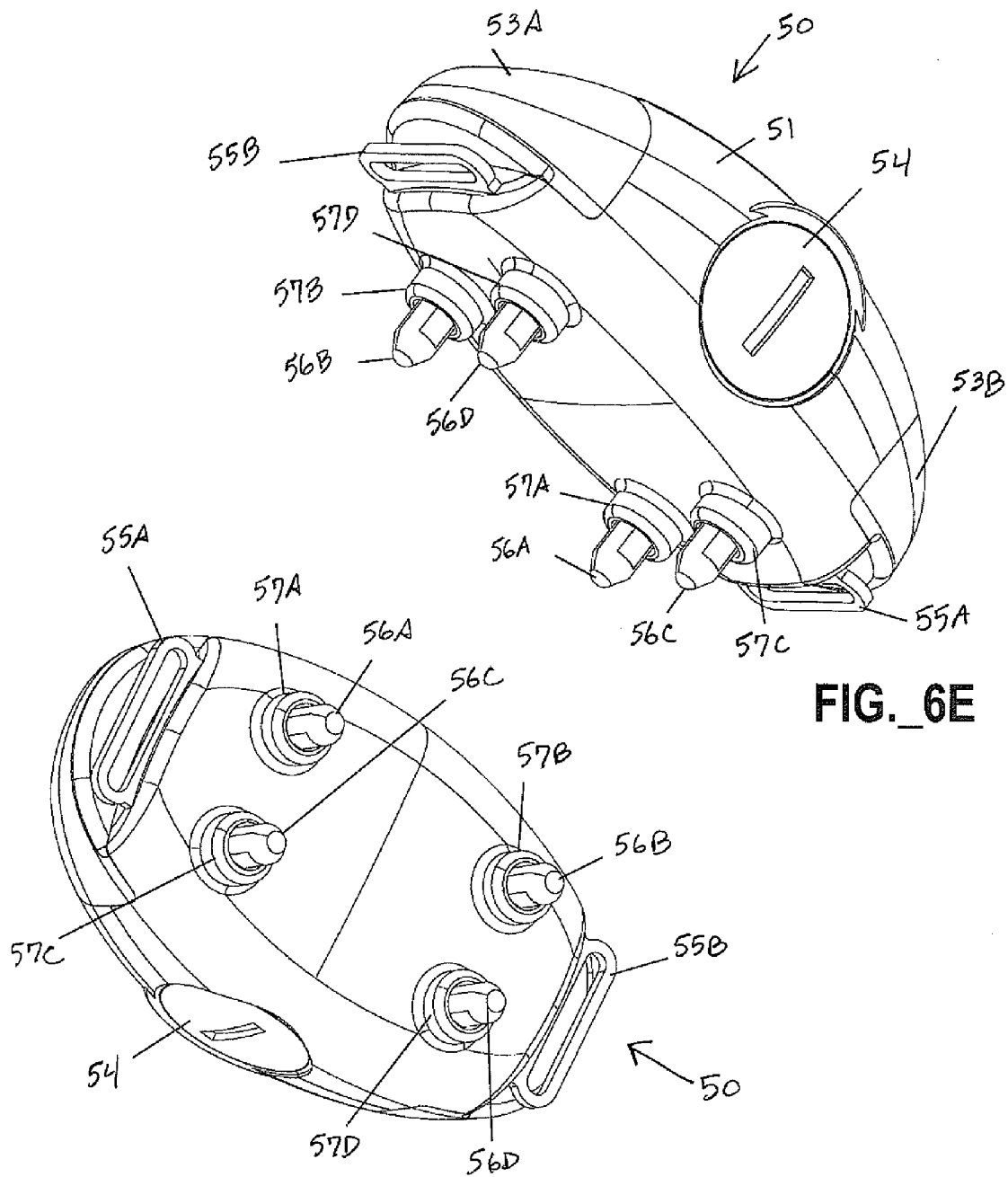

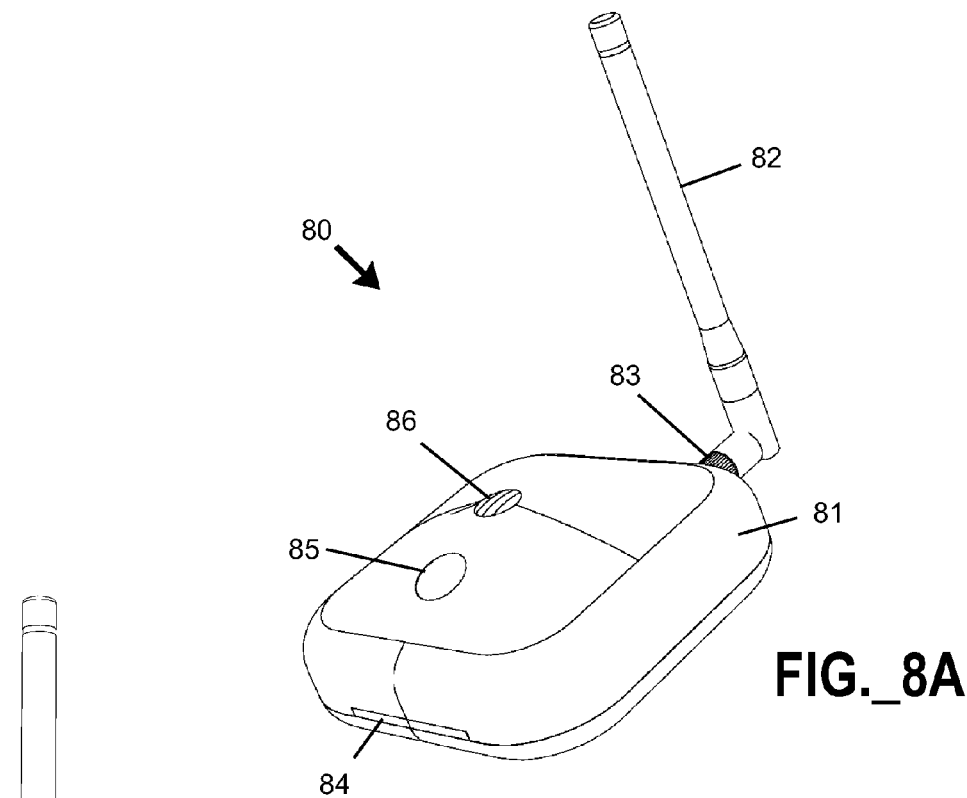
FIG._8A
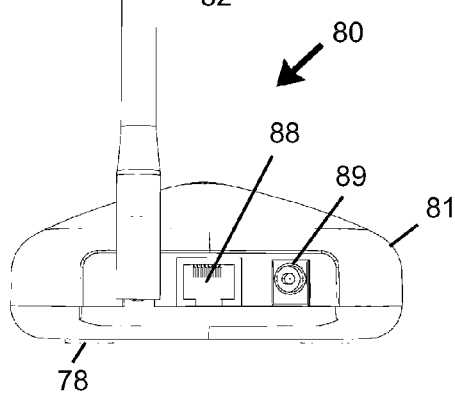
FIG._8B
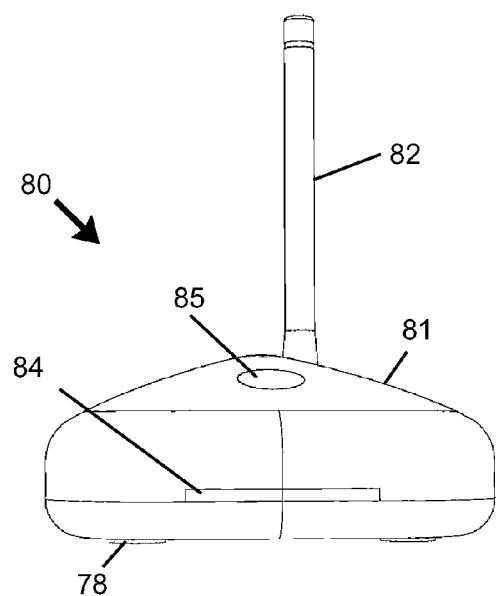
FIG._8C

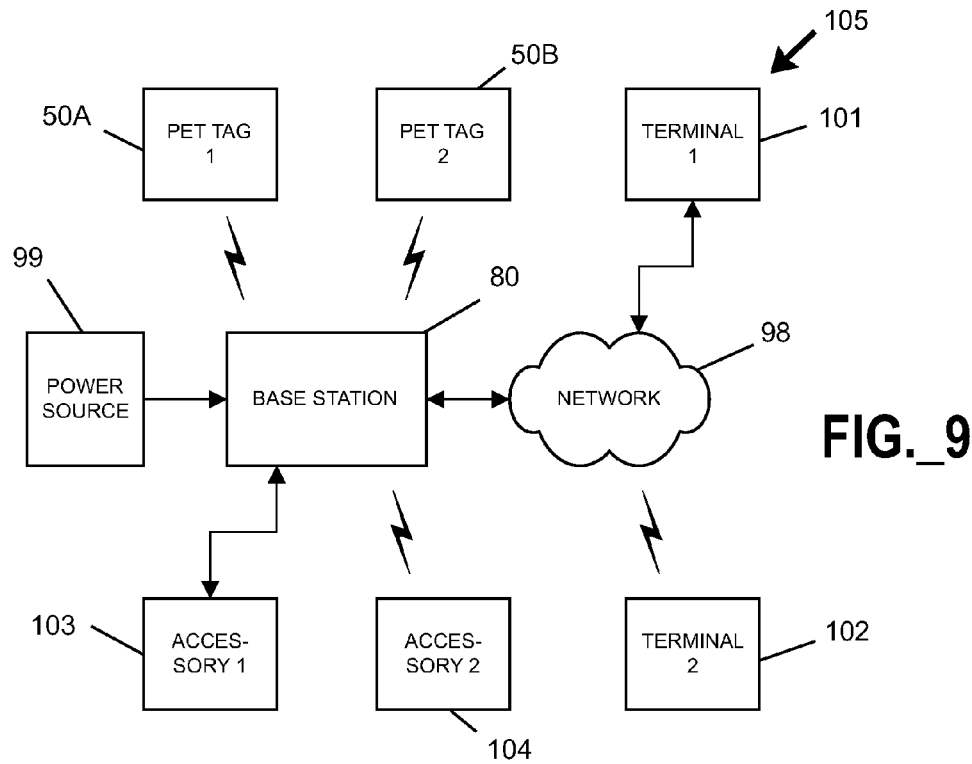
FIG._9
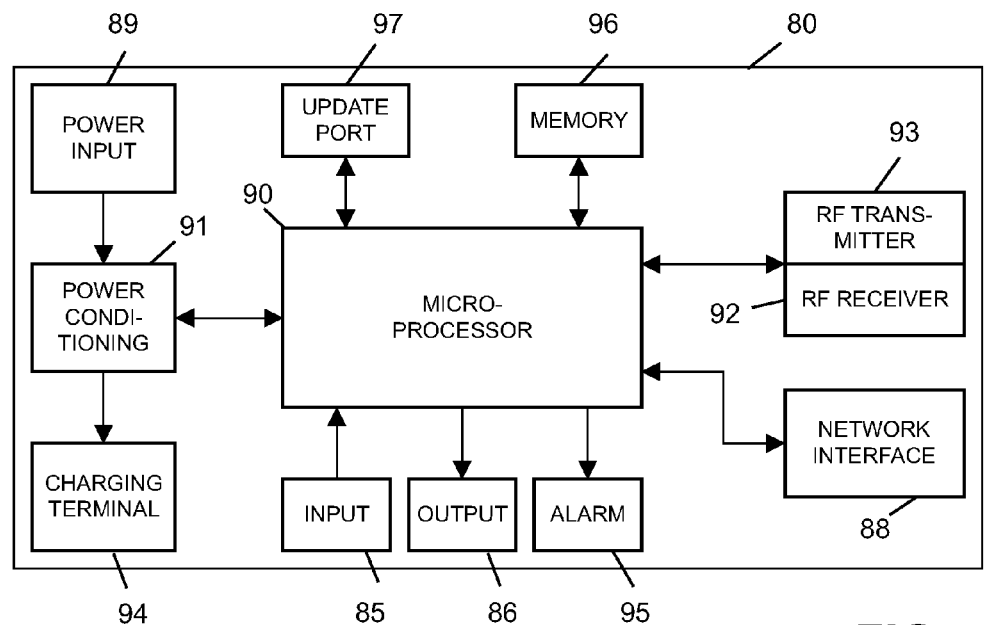
FIG._10

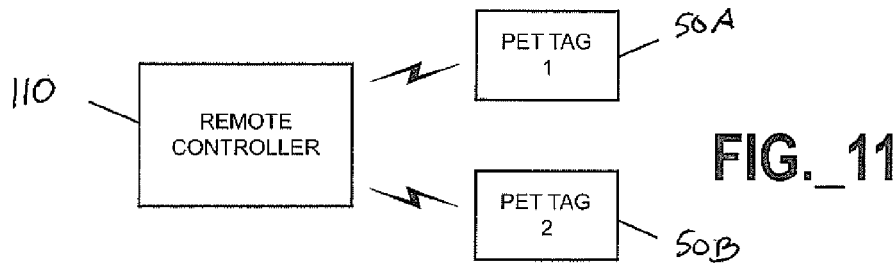
FIG._11
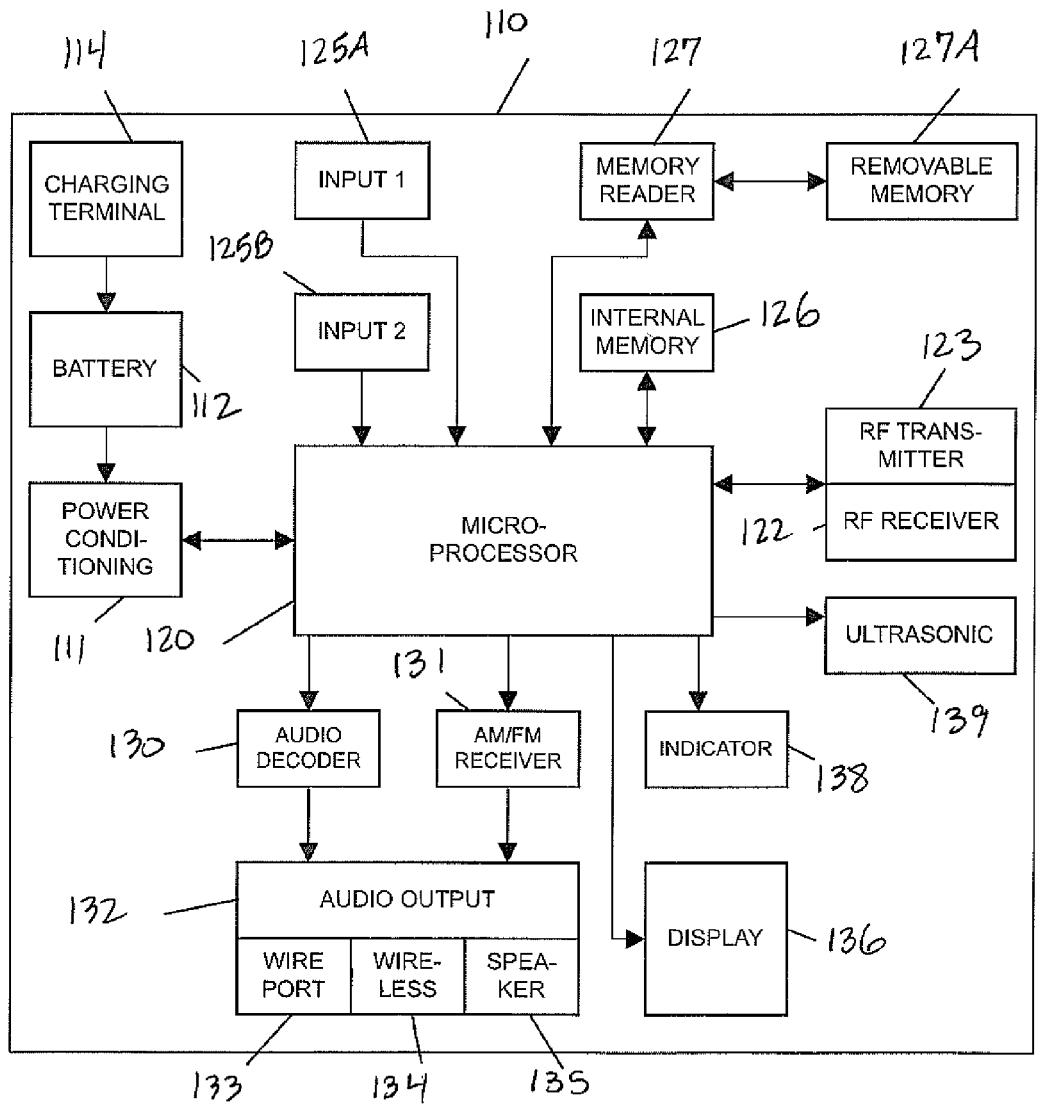
FIG._12

SYSTEMS AND METHODS FOR ANIMAL CONTAINMENT, TRAINING, AND TRACKING

STATEMENT OF RELATED APPLICATION

This application claims benefit and priority of U.S. Provisional Patent Application No. 61/241,866 filed on Sep. 12, 2009. Such application is hereby incorporated by reference as if set forth fully herein.

FIELD OF THE INVENTION

The present invention relates to systems and methods containing, training, and tracking of animals, including pets such as dogs.

DESCRIPTION OF THE RELATED ART

Companion animals or pets provide numerous benefits to their caregivers. Caring for a companion animal provides purpose and fulfillment, and lessens feelings of loneliness and depression in people of all age groups. Various pet behaviors, however, can present challenges and frustrations to pet owners. It can be difficult and expensive to train or condition pets to refrain from unwelcome behaviors, such as: wandering into off-limits areas of a home or area, jumping on house guests, begging for food, barking uncontrollably, escaping outside beyond the confines of a yard, and exhibiting aggression toward other animals. It can also be devastating to learn of the escape and possible loss of a pet.

Certain systems targeting specific unwelcome pet behaviors are known. In-ground outdoor boundary wire systems arranged to communicate with pet collars (e.g., as disclosed in U.S. Pat. No. 3,753,421) dissuade pets from escaping predefined outdoor areas, but such systems are difficult to install and reconfigure, and do little or nothing to address pet behavior within the confines of a defined area, such as within a home. Anti-bark collars can deliver audible stimulus (e.g., a tone) or tactile stimulus (e.g., a shock or vibration) to an animal upon detection of a barking condition, and/or stimulus may be delivered by collar to an animal upon activation of an associated radio frequency (RF) remote control unit for training purposes (as disclosed in U.S. Pat. No. 6,860,240). Stationary infrared transmitters emitting different command signals may be mounted in groups to define overlapping zones for communicating with an animal wearing an electronic collar to provide warning and discipline signals, respectively (e.g., via audible or tactile feedback), to dissuade pets from entering designated areas (such as disclosed in U.S. Pat. No. 5,642,690). A global positioning unit and a wireless communication apparatus may be embodied in a pet collar to facilitate locating or tracking an animal (such as disclosed in U.S. Pat. No. 6,720,879).

The foregoing and other conventional systems suffer from restrictions that limit their utility. It would be desirable to provide systems and methods that address unwelcome animal behaviors and may be tailored to different animals and owner preferences. It would be desirable to provide systems with enhanced portability and durability. It would be desirable to enhance battery life and/or reduce the size of electronic animal collars. It would be desirable to provide enhanced capabilities for detection and reporting of conditions indicative of unwelcome animal behaviors. It would be desirable to facilitate training of animals at a reasonable cost and at the convenience of an animal owner or caregiver. In consequence, the art continues to seek improvements in animal containment, training, and tracking systems.

SUMMARY OF THE INVENTION

The present invention relates in various aspects to systems and methods containing, training, and/or tracking of animals, utilizing electronic animal tags or collars, and related electronic communication devices.

In one aspect, the invention relates to an animal collar or tag coupleable to an animal and adapted to communicate wirelessly with a radio frequency (RF) base station, the animal collar or tag comprising: a power storage element; a microprocessor arranged to receive power supplied by the power storage element; and a RF transmitter and a RF receiver operatively coupled with the microprocessor and adapted to communicate wirelessly with the RF base station.

In another aspect, the invention relates to a radio frequency (RF) base station adapted for RF wireless communication with an animal collar or tag wearable by an animal and including a mobile RF transmitter and a mobile RF receiver, the RF base station comprising: a base station microprocessor; and a base station RF receiver and a base station RF transmitter operatively coupled with the base station microprocessor and adapted for wireless communication with the mobile RF transmitter and a mobile RF receiver, respectively; wherein the base station is adapted to generate an alarm signal responsive to receipt or non-receipt of a RF signal indicative of at least one of: condition of the animal, behavior of the animal, and proximity of the animal to the base station In another aspect, the invention relates to a directional zone defining unit adapted for use with a animal collar or tag that includes infrared (IR) receiver, the directional zone defining unit comprising: a body structure; an IR transmitter retained by the body structure, wherein at least a portion of the IR transmitter is movable to allow directional aiming of an IR beam emitted therefrom to be received by the IR receiver; and at least one user input to enable a user to select different modes of operation of the zone defining unit relative to the animal collar or tag.

A further aspect of the invention relates to an animal training system comprising a handheld remote controller adapted for RF wireless communication with an animal collar or tag wearable by an animal and including a mobile RF receiver and at least one animal-perceptible signal generator, the handheld remote controller comprising: a RF transmitter adapted for wireless RF communication with the mobile RF receiver; at least one user input adapted to generate a correction signal for transmission via the RF transmitter to the mobile RF receiver to operate the animal-perceptible signal generator; at least one of (i) a memory element arranged to store animal training instructions, and (ii) a memory element interface adapted to receive a memory element arranged to store animal training instructions; and an audio output element adapted to facilitate delivery to a user of an audible signal including animal training instructions upon playback of stored animal training instructions from said memory element.

In another aspect, any of the foregoing aspects or other aspects and features described herein may be combined for additional advantage.

Other aspects, features and embodiments of the invention will be more fully apparent from the ensuing disclosure and appended claims.

BRIEF DESCRIPTION OF THE DRAWINGS

FIG. 1A is a perspective view of a directional zone defining unit including an infrared transmitter and adapted for use with an electronic animal collar or tag to promote containment of an animal within a desired area.

FIG. 1B is a top plan view of the directional zone defining unit of FIG. 1A.

FIG. 1C is a bottom plan view of the directional zone defining unit of FIGS. 1A-1B.

FIG. 1D is a front elevation view of the directional zone defining unit of FIGS. 1A-1C.

FIG. 1E is a rear elevation view of the directional zone defining unit of FIGS. 1A-1D.

FIG. 1F is a right side elevation view of the directional zone defining unit of FIGS. 1A-1E.

FIG. 1G is a left side elevation view of the directional zone defining unit of FIGS. 1A-1F.

FIG. 2 is a schematic diagram showing functional relationships between various elements of the directional zone defining unit of FIGS. 1A-1G.

FIG. 3 is a simplified top view schematic of an animal containment system including the directional zone defining unit of FIG. 2 engaged with an electrical outlet and arranged to transmit an infrared beam proximate to multiple electronic animal tags each including an infrared receiver.

FIG. 4 is a simplified top view schematic of a animal containment system including the directional zone defining unit of FIG. 2 coupled with a battery receptacle having an associated surface mounting element.

FIG. 5A is a top plan view of a animal collar having an associated electronic animal tag.

FIG. 5B is a front elevation view of the animal collar and electronic animal tag of FIG. 5A.

FIG. 5C is a perspective view of the animal collar and electronic animal tag of FIG. 5C.

FIG. 6E is a lower perspective view of the electronic animal tag of FIGS. 6A-6D.

FIG. 6F is a rear perspective view of the electronic animal tag of FIGS. 6A-6E.

FIG. 7 is a schematic diagram showing functional relationships between various elements of the electronic animal tag of FIGS. 6A-6F.

FIG. 8A is a front perspective view of a base station for radio frequency communication with one or more electronic animal tags, such as the electronic animal tag of FIGS. 6A-6F.

FIG. 8B is a rear elevation view of the base station of FIG. 8A.

FIG. 8C is a front elevation view of the base station of FIGS. 8A-8B.

FIG. 8D is a bottom plan view of the base station of FIGS. 8A-8C.

FIG. 8E is a rear perspective view of the base station of FIGS. 8A-8D.

FIG. 8F is a left side elevation view of the base station of FIGS. 8A-8E.

FIG. 8G is a top plan view of the base station of FIGS. 8A-8F.

FIG. 9 is a schematic diagram showing various elements of an animal containment and monitoring system including the base station of FIGS. 8A-8G arranged to communicate with multiple electronic animal tags according to FIGS. 6A-6F and FIG. 7.

FIG. 10 is a schematic diagram showing functional relationships between various elements of the base station of FIG. 8A-8G.

FIG. 11 is a schematic diagram showing various elements of an animal training system including an electronic remote controller arranged for wireless communication with at least one electronic animal tag according to FIGS. 6A-6F and FIG. 7.

FIG. 12 is a schematic diagram showing functional relationships between various elements of a remote controller (such as the remote controller illustrated in FIG. 11) arranged for wireless communication with at least one electronic animal tag.

DETAILED DESCRIPTION

Figure 6A:
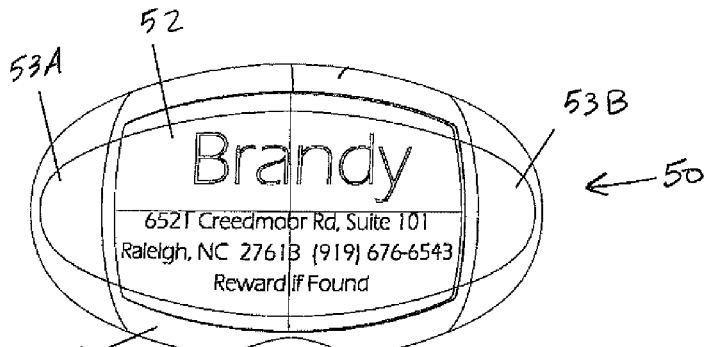
FIG. 6A is a front elevation view of an electronic animal tag such as included in FIGS. 5A-5C.
Figure 6B:
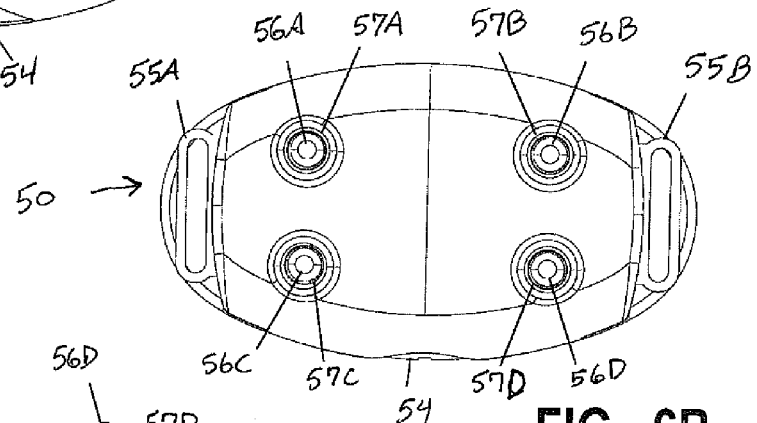
FIG. 6B is a rear elevation view of the electronic animal tag of FIG. 6A.
Figure 6C:
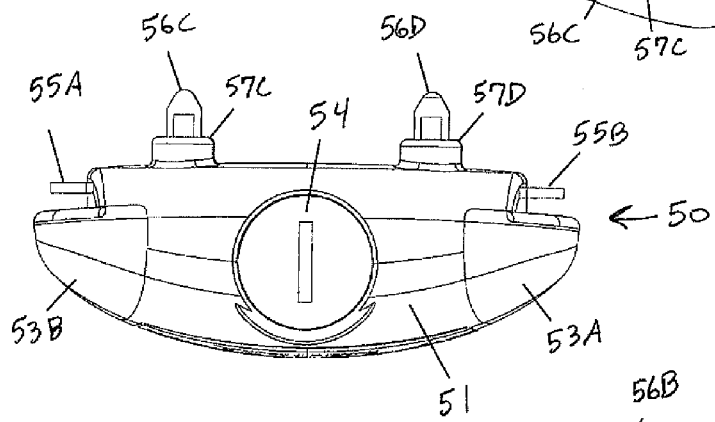
FIG. 6C is a bottom plan view of the electronic animal tag of FIGS. 6A-6B.
Figure 6D:
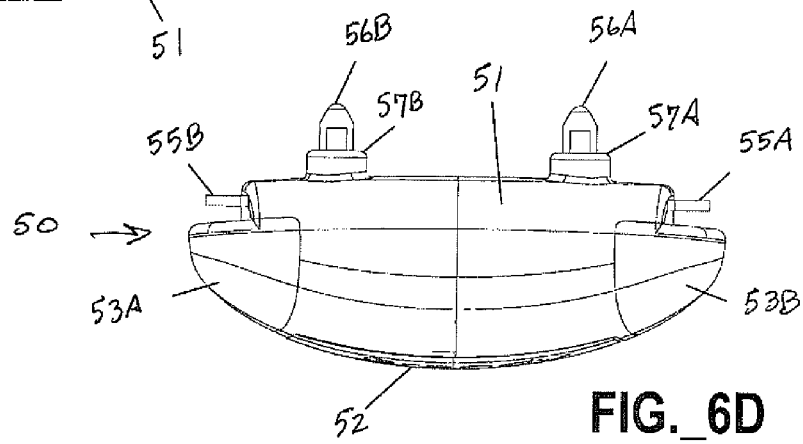
FIG. 6D is a top plan view of the electronic animal tag of FIGS. 6A-6C.

The present invention relates in various aspects to systems and methods for containing, training, and/or tracking of animals, utilizing electronic animal tags (optionally embodied in collars incorporating same), and related electronic communication devices. Although various references are made herein to "pets," it is to be understood that the invention relates to systems and methods relating to containment, training, and/or tracking of animals of any type, including but not limited to mammals.

In one embodiment, a pet containment system includes a directional zone defining unit (ZDU) including an infrared (IR) transmitter, the ZDU being adapted for use with an electronic pet tag or collar. The ZDU includes multiple user-selectable modes of operation, such as warning and correction modes, is arranged for both mounting and receiving power via at least one electrical connector, and has a signal transmitter that is movable to allow directional aiming of an IR beam emitted therefrom to be received by the IR receiver. Use of a single ZDU having multiple user-selectable operating modes is in contrast to prior systems (e.g., as disclosed in U.S. Pat. No. 5,642,690) that required concurrent use of multiple transmitters to broadcast different commands. Numerous other distinctions over prior systems are embodied in the inventive systems and devices disclosed herein.

A directional ZDU 10 including an infrared transmitter is shown in FIGS. 1A-1G. The directional ZDU 10 includes a lower body structure 12 of generally cylindrical shape, with first and second electrical connectors 20A, 20B protruding from a bottom surface 11 of the lower body structure 12. The electrical connectors are preferably adapted to mate with a wall receptacle for providing AC electrical power, and sufficiently sized and shaped so as not to obscure a second outlet of a standard dual outlet wall plate with center-to-center outlet spacing of 1.5 inches. Preferably, at least a portion of a ZDU has an external diameter or lateral width of less than two inches to avoid interference with a second outlet of a standard dual outlet wall plate. Although only two connectors 20A, 20B are shown, it is to be appreciated that additional connectors (e.g., including a ground connector) may be provided. At least a portion of the ZDU is preferably paintable to enable a user to match a desired decor.

A front portion of the lower body structure includes at least one user input element 18 (e.g., a button), and at least one output element 19 (e.g., a multi-color LED or other indicator lamp). An audible output element may be additionally or alternatively provided. Multiple user input elements of like or different types may be provided. In one embodiment, a user input element comprises a signal receiver operatively connected to the ZDU 10 arranged to receive a remote user input, such as from a wireless remote controller, and/or a data signal transmitted via a power line (also known as power line communications). The user input element 18 allows a user to control a mode of operation of the ZDU 10 relative to an associated electronic pet collar or tag; similarly, the output element(s) preferably provide a user-perceptible signal indicative of a currently selected mode of operation of the ZDU 10 relative to an associated pet collar or tag.

Along an upper edge of the lower body structure 12 is a rotatable joint 13 between the lower body structure 12 and a rotatable upper body structure or turret 14, with the joint 13 permitting the turret 14 to rotate along a first axis (e.g., a longitudinal axis definable through a center point of the bottom surface 11). The turret 14 as shown in FIGS. 1A-1G is generally hemispherical in shape, with a recess 15 containing therein a wheel element 16 defining a signal emitter port 17 arranged to direct a signal in a direction selected by a user. A sliding element (not shown) may be used in place of a rotatable wheel element 16 in an alternative embodiment. The wheel element 16 is preferably mounted along a second axis substantially perpendicular to the first axis (e.g., a latitudinal axis perpendicular to the longitudinal axis). The wheel element 16 and recess 15 define a joint 15A therebetween. The turret 14 preferably has an internal travel stop to prevent continuous rotation from damaging electrical connections; preferably the turret may be rotated around the longitudinal axis within a range of motion of at least about 320 degrees, more preferably at least about 340 degrees, and more preferably still at least about 355 degrees. Such travel stop prevents continuous rotation of the turret 14 relative to the lower body structure 12 to prevent damage to electrical conductors disposed inside the ZDU 10. The wheel element 16 preferably has a range of motion of at least about 90 degrees.

An IR beam port 17 is defined in the wheel element 16. A user may selectively rotate the wheel element 16 and/or the turret 14 along the respective two axes of rotation thereof to permit directional aiming of an IR beam emitted from the IR beam port 17, so as to define a response zone as desired within a space.

Various components of a ZDU 10 are illustrated in FIG. 2. At least one power input terminal 20 receives power from a power source (e.g., AC outlet or battery pack). A power conditioning element 21 may provide power conditioning and/or regulating utility, including AC/DC power conversion. Although only a microprocessor 25 is shown in direct electrical communication with the power conditioning element 21, it is to be appreciated that electrical power may be conducted to any of various electrically operated elements in the ZDU 10, whether or not through the microprocessor 25. At least one input element 18 and at least one output element 19 are arranged to communicate with the microprocessor 25. A transmitter 23 (preferably adapted to output an IR beam), and an optional receiver 24 (e.g., to receive a RF signal from a remote controller and/or from a pet tag or collar) are further arranged to communicate with the microprocessor 25. A computer-readable or processor-readable instruction set (e.g., operating instructions) for execution by the microprocessor 25 may be stored on a memory element 26. Operating instructions for the ZDU 10 may be updated via an optional update port 28 (e.g., a miniature USB port or similar interface). The update port 28 may further be used to read or extract information logged to the memory 26, as the memory 26 may be used to store information received from the input element 18 and/or the receiver 24. A night light 2 may be operatively coupled to a body structure of the ZDI 10 and arranged to automatically light an area proximate to the directional zone defining unit during low ambient light conditions.

Referring to FIG. 3, a ZDU 10 may be engaged to an electrical receptacle 5 via electrical connectors 20A, 20B protruding from the body structure of the ZDU 10. In another embodiment shown in FIG. 4, a ZDU 10 may be operatively coupled to a battery pack 6 (e.g., using electrical connectors 20A, 20B, or other dedicated mechanical and/or coupling means), and an engaging element 8 (e.g., a clamp, a suction cup, a magnet, an adhesive surface, a mechanical fastener, a twist tie, or the like) may be associated with the battery pack 6 to permit the battery pack 6 and associated ZDU to be temporarily or permanently affixed to a desired surface or object if an electrical power outlet is not otherwise available.

Referring back to FIG. 3, an IR beam including boundaries 29A, 29B defines a response zone 29. Multiple electronic pet tags or collars 50A, 50B may be disposed proximate to the ZDU 10. Depending on the operating mode selected for the ZDU, any of various actions may be triggered upon entry of a tag or collar 50A, 50B into the response zone 29. Adjustment of the operating mode (e.g., through use of the user input element 18) preferably causes alteration of an IR signal emitted by the ZDU 10, with possible alterations including, for example, pulse shape, pulse pattern, pulse duration, frequency, and amplitude. Such IR signal propagates into the response zone 29. Upon detection of the IR signal by a pet collar or tag 50A, such tag 50A may take appropriate responsive action based upon the content of the IR signal (indicative of operating mode). Various different operating modes (selectable at the ZDU) and corresponding responses (implemented by a pet collar or tag 50A) tag be selected. The pet collar or tag 50A may further embody one or more sensors (e.g., a piezoelectric bark sensor to detect when a dog is growling or barking), and signals from such sensor(s) may further affect responsive action to be taken by the pet collar or tag. Various operating modes may therefore be selected to utilize the ZDU solely to contain a pet to a desired area, solely to prevent barking/growling/whining, or to provide both pet containment utility and pet noise (e.g., bark) deterrence utility. In one embodiment, if the ZDU is placed in a mode to provide pet noise deterrence only, then receipt by the pet collar or tag of a single transient IR signal from the ZDU (i.e., until receipt of a subsequent different signal) may be used merely to temporarily 'program' the pet collar or tag to respond in to pet noise in a user-specified way, such that the pet need not maintain presence in a response zone to maintain the temporary programming. In another embodiment, a ZDU may be placed in a mode to provide pet noise deterrence only while the pet is located within a response zone.

In one embodiment, at least one operating mode includes administration of a warning signal (e.g., vibration, audible signal, and/or electric shock of low intensity) for a specified time period if a pet collar or tag should receive an IR signal (from the ZDU) within a response zone, and then administer a correction/discipline signal (e.g., high amplitude vibration and/or electric shock of higher intensity) if the pet wearing the pet tag or collar does not cease an offending behavior (e.g., barking and/or presence within a response zone) shortly thereafter. For example, a warning signal may be administered for a period of two seconds (or so long as the pet remains in the response zone) via a pet tag or collar upon entry of a pet into a response zone, and if the pet does not exit the response zone within three seconds, then a correction signal will be administered by the pet tag or collar.

In one embodiment, at least one operating mode causes the pet collar or tag to administer vibration, and at least one other operating mode causes the pet collar or tag to administer electric shock. Such adjustment permits a user to select an action appropriate to a specific pet to deter unwanted behavior.

In one embodiment, a plurality of operating modes includes (i) at least one "anti-bark" mode to cause the pet collar or tag to administer any of a warning signal and a correction signal upon detection of sound or vibration emitted by a pet (e.g., a bark) wearing the pet collar or tag, and (ii) at least one other "permissive bark" mode to cause the pet collar or tag to neither administer a warning signal nor administer a correction signal upon detection of sound or vibration emitted by a pet wearing the pet collar or tag.

In one embodiment, a plurality of operating modes includes at least one mode in which, upon detection of sound or vibration emitted by the pet wearing the pet collar or tag prior to entry of the pet collar or tag into the response zone, the pet collar or tag is caused to temporarily suspend administration of a warning signal or a correction signal after entry of the pet collar or tag into the response zone. Such mode may be useful so as not to deter a pet dog from barking upon hearing a suspicious noise suggestive of an intruder, or confronting an intruder near a point of entry. For example, a ZDU may be placed to define a response zone near a door or other point of entry into a home. A dog located outside the response zone may hear a noise suggestive of an intruder seeking forced entry. If the dog should start barking before entering the response zone, then administration of a warning signal or a correction signal to the dog may be suspended while the dog is in the response zone (or for a specified period after entry into or exit from the response zone). In one embodiment, a suspension of warning and/or correction signal may be restricted only to barking, to maintain containment functionality so as to prevent escape of the pet if a door or window is opened. The foregoing operating mode (temporary suspension of warning or correction if a pet barks before entering a response zone) may be automatically terminated upon a specified condition, such as expiration of time, cessation of barking for a specified time, and/or absence from the response zone for a specified time. The foregoing operating mode may be desirably implemented at night when occupants of a home are normally sleeping, and when it may be useful for a dog to bark and/or confront an intruder. In one embodiment, an automatic input (e.g., light sensor, timer, etc.) may be provided in a ZDU, and the ZDU may be programmed to automatically adopt the foregoing operating mode upon detection of an automatic input suggestive of a nighttime (or other) condition.

In one embodiment, a ZDU may include the following operating modes with associated user-perceptible output signals provided by at least one indicator lamp (e.g., by combinations of lit lamp colors, flashing lamp patterns, alternating lamp color patters, and the like).

(1) Zone containment only with administration of warning signal only by pet collar or tag;
(2) Zone containment only with administration of warning signal, followed with correction signal, by pet collar or tag;
(3) Zone containment only with administration of correction signal only by pet collar or tag;
(4) Pet noise (e.g., bark) deterrence only with administration of warning signal only by pet collar or tag;
(5) Pet noise deterrence only with administration of warning signal, followed with correction signal, by pet collar or tag;
(6) Pet noise deterrence only with administration of correction signal only by pet collar or tag;
(7) Zone containment and independent noise deterrence with administration of warning signal only by pet collar or tag;
(8) Zone containment and independent noise deterrence with administration of warning signal, followed by correction signal, by pet collar or tag;
(9) Zone containment and independent noise deterrence with administration of correction signal only by pet collar or tag;
(10) Zone-dependent noise deterrence, with administration of warning signal only by pet collar or tag;
(11) Zone-dependent noise deterrence, with administration of warning signal, followed by correction signal, by pet collar or tag; and
(12) Zone-dependent noise deterrence, with administration of correction signal only.

Any of the foregoing exemplary operating modes may be omitted or supplemented with additional response, expiration, and/or sensor-dependent features, as may be readily implemented in a processor-readable instruction set stored in a pet tag or collar according to the present invention. Modes of operation of an electronic pet collar or tag may also be updated and controlled via a radio frequency base station as disclosed herein.

A pet collar 35 having an electronic pet tag 50 is shown in FIGS. 5A-5C. The collar 35 includes securable clasp portions 32, 33 affixed to a strap 31. Portions of the strap 31 may be inserted through hole-defining mounting tabs 55A, 55B secured to a body 51 of the collar. Preferably, the tabs 55A, 55B are formed of a continuous piece of durable material (e.g., steel) that extends through the body 51 to minimize possibility of separation of either tab 55A, 55B from the body 51. The electronic tag 50 has affixed thereto a pet identification plate 52, which may include a pet name, address, telephone number, email address, and similar identifying information. The electronic tag 50 further includes lamp windows (or lamps) 53A, 53B that may be activated upon escape of a pet wearing the tag 50 from a specified area (e.g., as detected by a base station upon severing of communications between the base station and the electronic tag), in order to increase visibility of the pet (e.g., to help locate the pet, and further to enable motorists to steer clear of the pet in low light conditions).

The electronic tag 50 includes multiple shock terminals 56A-56D removably mounted to receptacles 57A-57D. Four shock terminal 56A-56D are preferably provided to distribute contact force over a significant area and thereby reduce contact stress that may otherwise lead to pet skin abrasion. Removable mounting of the shock terminals 56A-56D permits such terminals to be interchanged with terminals of different length, width, tip shape, and the like, depending on the hair length and type of the pet to promote, and also depending on the sensitivity of the pet's skin to the size and/or shape of the terminals 56A-56D. In one embodiment, the shock terminals may be removed and replaced with non-conducting caps (not shown) to promote appeal of the electronic tag 50 to pet owners not comfortable with the possibility that electric shock may be administered to a pet wearing the tag 50. The body 51 may be coated with rubberized material (e.g., rubberized paint) to hold on to dog dander for more comfortable fit. A removable battery cover 54 is preferably a screw-type cover with an associated gasket or O-ring (not shown) to promote water-tight sealing of the body 51. A battery (e.g., rechargeable lithium ion 3V, or other conventional one or more batteries) may be disposed within the body 51 behind the battery cover 54.

FIG. 7 is a schematic diagram showing functional relationships between various elements of the electronic pet tag 50. A battery 62 (or other charge storage element) may be recharged with at least one optional recharging terminal 61. In one embodiment, two or more of the shock terminals 56A-56D may be used as recharging terminals in order to charge the battery with via a mating charging base (not shown). A power conditioning element 21 may provide any desirable power conditioning and/or regulating utility, and supply power to the microprocessor 60. Although only a microprocessor 60 is shown in direct electrical communication with the power conditioning element 63, it is to be appreciated that electrical power may be conducted to any of various electrically operated elements in the electronic tag 50, whether or not through the microprocessor 60. A computer-readable or processor-readable instruction set (e.g., operating instructions) for execution by the microprocessor 60 may be stored on a memory element 66. Operating instructions for the electronic tag 50 may be updated via an optional update port 67 (e.g., a miniature USB port or similar interface), or alternatively via a RF receiver 72. The update port 67 may further be used to read or extract information logged to the memory 66, as the memory 66 may be used to store information received from various sensors 65A, 65B and/or signal receivers 70, 72, 75. Operating instructions for the electronic tag 50 that may be updated via the RF receiver 72 in communication with the RF base station include, but are not limited to, user-selectable settings and modes of operation of the electronic tag, including "anti-bark" mode, "permissive bark" mode, or any other suitable predefined or user-defining modes or settings including those mentioned therein.

Various sensors 65A, 65B may be associated with the electronic tag 50 to sense conditions experienced by the tag 50 and/or physiological conditions of a pet wearing the electronic tag 50. While only two sensors 65A, 65B are shown, it is to be appreciated that additional sensors (or fewer sensors) may be provided. In certain embodiments, the sensors 65A, 65B may be arranged to sense any one or more of temperature, pressure, moisture, motion, acceleration, noise, pulse/heartbeat, and the like. Signals from the sensors 65A, 65B may be used to trigger alarms and/or implement other actions. For example, sensing of excess temperature by the sensors 65A, 65B may indicate that a pet is located in a dangerously hot environment (e.g., a hot car interior). Sensing of moisture by the sensors 65A, 65B may indicate that a pet has fallen into a pool or lake. Sensing of movement and/or acceleration by the sensors 65A, 65B may indicate that the pet is awake, whereas lack of motion and/or acceleration for a specified period may indicate that the pet is asleep. Signals from multiple sensors of different types (e.g., at least two of movement, acceleration, noise, vibration, etc.) may be used in combination to verify whether a pet is barking, with one exemplary embodiment involving noise sensing in combination with acceleration or motion sensing. Sensing of noise with the sensors 65A, 65B may be used to augment signals received from a piezoelectric element 70 (useful for both bark detection and administering vibration) to discriminate between barks and other sounds (e.g., whines, growls) emitted by a pet wearing an electronic tag 50, and/or confirm whether a bark or other sound is emanating from the pet wearing the electronic tag 50. Output of a sensor of one type may be used to at least temporarily affect operation or signal processing (e.g., sensitivity, sampling rate, filtering, amplification, etc.) of another sensor to verify whether a pet wearing an electronic collar or tag is actually barking. For example, upon sensing of motion indicative of a bark, an accelerometer may output a signal that is used to affect operation of a noise (sonic) sensor arranged to sense a bark or to affect processing of signals generated by the noise sensor, whereby to at least temporarily the sensitivity of the noise sensor may be increased, filtration of the noise signal may be affected, or sampling rate of the noise sensor may be affected, or any other suitable change to sensor operation or signal processing may be employed, in order to enhance bark detection. Actions such as triggering of alarms, triggering of (e.g., user) notification events, activation of lights 53, depowering of the tag 50, logging data (or logging data at higher frequency), and the like may be implemented in response to receipt of signals from the sensors 65A, 65B.

The electronic tag 50 includes an IR receiver 70 (e.g., for communication with a directional ZDU 10 as described hereinabove, and a RF receiver 72 and RF transmitter 73 operatively coupled with the microprocessor 60 and arranged for wireless two-way communication with any of (1) a RF base station and (2) a RF remote controller. Various information communicated from the electronic tag to a base station includes tag status, battery life, and sensor information. In one embodiment, content and frequency of transmission of sensor information from an electronic pet tag 50 to a base station, or logging of such information, may be configured by a user. The RF receiver 72 and RF transmitter 73 may be optionally combined in an integrated transceiver, and may be associated with an optional antenna (not shown). In one embodiment, the RF receiver 72 and RF transmitter 73 operate at 433 MHz. The electronic tag 50 may further include an associated Global Positioning System (GPS) element 75 arranged to receive satellite signals. In one embodiment, the GPS element 75 may be integrated into the electronic tag 50. In another embodiment, the GPS element 75 may be mechanically coupleable to the electronic tag. In one embodiment, the GPS element may interface with the electronic tag via the shock terminals 56A-56D or another electrical interface (not shown).

The electronic tag 50 further includes a shock element 68 (such as may be coupled to the shock terminals 68A-68D), a piezoelectric element 70 (useable as both a vibration (bark) detection sensor and a vibration administering element), one or more lights 53, and an audio output element 69 such as a tone generator or speaker.

Operation of the electronic tag 50 in conjunction with a ZDU 10 adapted to output an infrared beam has been described hereinabove. The RF communication functions of the electronic tag 50 are particularly useful for communicating with a RF base station and a RF remote controller, as described below.

In one embodiment, an electronic tag 50 includes a sensor adapted to sense a condition correlative of movement or stasis of the pet and generate a sensor output signal, wherein the pet collar or tag is adapted to automatically alter operating status to reduce power consumption of the pet collar or tag responsive to receipt of a sensor output signal correlative of stasis of the pet. Such a sensor may include a motion sensor or acceleration sensor. Upon detection of a condition suggesting that a pet is sleeping, operating status of an electronic pet tag 50 may be altered, such that two-way RF communication between the collar 50 and a base station (e.g., a base station 80 as discussed below) may be reduced in update frequency to reduce power consumption of the electronic pet tag 50. Reduction in communication frequency reduces power consumption and thereby prolongs battery life. Power savings may be quite substantial, since many pets (e.g., dogs and cats) may spend between 50-70% of the time sleeping. Upon sensing of movement of the pet (e.g., according to a temporal or amplitude threshold), the tag 50 may be returned to a normal operating condition, e.g., with short intervals between communication updates with the base station.

Various external views of a RF base station 80 are provided in FIGS. 8A-8G. The base station 80 includes a body structure 81, an antenna 82, an antenna interface 83, at least one user input element 85, at least one user-perceptible output element 86, a power input port 89, and at least one network port 88. In one embodiment, the network port 88 comprises an Ethernet port; a network port 88 may further comprise a telephone cable port. A speaker opening or vent 84 may be defined in the body structure 81 to allow propagation of alarm noise outside the body structure 81. Pads 78 and mounting holes 79 may be defined in a bottom surface of the base station 80.

FIG. 10 is a schematic diagram showing functional relationships between various elements of the base station 80. At least one power input terminal 89 receives power from a power source (e.g., AC outlet or battery pack). A power conditioning element 91 may provide power conditioning and/or regulating utility, including AC/DC power conversion. Although only a microprocessor 90 is shown in direct electrical communication with the power conditioning element 91, it is to be appreciated that electrical power may be conducted to any of various electrically operated elements in the base station 80, whether or not through the microprocessor 90. At least one input element 85 and at least one output element 86 are arranged to communicate with the microprocessor 90. An alarm generator 95 may output an audible alarm, output a visible alarm, and/or trigger a remote alarm, such as notification of one or more users, home alarm monitoring companies, animal shelters, law enforcement agencies, and third parties (e.g., via a network interface 88).

A computer-readable or processor-readable instruction set (e.g., operating instructions) for execution by the microprocessor 90 may be stored on a memory element 96. Operating instructions for the base station 80 may be updated via a network interface 88 an optional update port 97 (e.g., USB port, miniature USB port, or the like). The update port 97 may further be used to read or extract information logged to the memory 96, as the memory 96 may be used to store information received from the RF receiver and/or from an external network via the network interface 88.

A RF transmitter 93 and a RF receiver 92 (optionally integrated within a RF transceiver) are further arranged to communicate with the microprocessor 25, and may communicate wirelessly in two-way fashion with one or more electronic pet tags 50 as described herein. In one embodiment, the RF transmitter 93 and RF receiver 92 may simultaneously communicate with up to eight different electronic pet tags as described herein.

FIG. 9 is a schematic diagram showing various elements of a pet containment and monitoring system 105 including the base station 80 and multiple electronic pet tags 50A, 50B. The base station 80 may be coupled with a power source 99, such as an AC outlet or a battery. While the electronic pet tags 50A, 50B are in sufficient proximity to the base station 80, such tags 50A, 50B are in two-way wireless RF communication with the base station 80. If any electronic pet tag 50A, 50B should go out of communication range with the base station 80 (e.g., for a threshold period, possibly on the order of twenty to thirty minutes, to guard against false alarms), such event may indicate that a pet wearing the tag 50A, 50B has escaped a specified area (e.g., a home or yard), and trigger the base station 80 to activate one or more alarms, initiate automatic notification procedures, and/or initiate tracking procedures.

In one embodiment, a base station includes an audible alarm that may be manually acknowledged, deactivated, or reset with a user input element 85. Acknowledgement, maintenance, or reset alarm conditions may be indicated with one or more user-perceptible output elements 86 (e.g., LED lamp(s)).

Notification procedures may be configured by a user upon initial set-up and registration of the base station 80. The base station 80 automatically synchronizes with one or more electronic pet tags in proximity upon power-up, and identifying information for each electronic tag is communicated automatically to the base station 80. An output element 86 (e.g., lamp) of the base station may provide one or more signals indicative of electronic pet tag synchronization status, electronic tag battery status, network communication status, and the like. The base station 80 may include a static IP address or other network identifier. The base station 80 may automatically register itself and synchronized electronic pet tags with a website. A user may utilize a communication device such as a personal computer, portable phone, or PDA to connect to a website providing one or more templates or form eliciting the following: (A) pet information (including pet description, pet photos, pet microchip information, and veterinary information), (B) user contact information and communication preferences (e.g., order of contact, format of electronic contact, priority of contact), and (C) third party contact information (e.g., home alarm monitoring company).

Any of various stationary or mobile terminals 101, 102 remotely located from the base station 80 may be contacted via at least one communication network 98 (e.g., Internet, telephone network, WiFi, WiMax, etc.) as part of an automatic notification procedure. Third parties susceptible to receiving notifications include, but are not limited to, one or more system users (e.g., owners of the pet to which the electronic pet tag is attached), family members or neighbors of system users, alarm monitoring companies, animal shelters, veterinary hospitals, law enforcement agencies, electronic pet tag manufacturers, and third party monitoring agencies. Notifications are preferably sent automatically without requiring human intervention. In one embodiment, communication is sent as a text message, SMS, and/or electronic mail to one or more users. In one embodiment, communication is sent via telephone including a recorded or machine-generated message. In one embodiment, pet identifying information (e.g., including vital pet information, and preferably including one or more pet photographs) and owner contact information is automatically transmitted to animal shelters within a desired vicinity of the user within a specified time period of loss of communications between the base station and electronic pet tag. In one embodiment, a "lost pet" flyer or poster is automatically generated and transmitted to or otherwise accessed by a user.

If an electronic pet tag should return to normal communication with the base station, an alarm may be cleared automatically, and communications indicating that the pet is safe may be automatically generated and distributed according to a communication procedure using contact information and preferences defined by a user. Additionally, or alternatively, an alarm may be cleared, reset, or overridden by a user via manual intervention at the base station, and such event may similarly trigger automated communications indicative of the alarm and/or pet status. In one embodiment, a website maintains and displays an automatically incrementing counter identifying the number of lost pets recovered by use of electronic pet tags 50 and base stations 80 as described herein, through use of data communicated by base stations to the website owner or operator.

Tracking procedures that may be initiated upon severing of contact between a base station 81 and an electronic pet tag 50 include initiation of GPS communication with a pet tag. Under circumstances when a pet is safely located in a home or fenced yard, communication between a GPS satellite and a GPS element 75 associated with an electronic pet tag 50 would be unnecessary and would dramatically shorten battery life of the pet tag 50A, 50B. By selectively activating a GPS element only when a pet has escaped a house or yard, as detected by a wireless RF base station 80, the benefits of GPS tracking may be employed only as necessary without unduly shortening battery life.

Two-way communication may be established between not only the base station 81 and each electronic pet tag 50A, 50B (e.g., via RF communication), but also between the base station 81 and remote electronic terminals 101, 102 (e.g., via the network 98 including wired or wireless access), and also between the base station 81 and one or more accessories 103, 104 (e.g., via wireless or wired communication). Any combination of communication paths may therefore be established. via the base station 81, (i) between remote electronic terminals 101, 102 and electronic pet tags 50A, 50B, (ii) between accessories 103, 104 and electronic pet tags 50A, 50B, and (iii) between remote electronic terminals 101, 102 and accessories 103, 104. Such communication paths may be used for any of remote data transfer, remote monitoring, remote control, remote updating (e.g., for software updates), and the like.

In one embodiment, data relating to information received from an electronic pet tag 50 is saved and may be transmitted to a user by way of a base station 80 and communication network. Such information may be presented in any desirable format, including tables, charts, and graphs, with respect to time. Trends may be established and monitored for pet location, pet barking time, pet barking frequency, pet barking duration, pet barking intensity, pet movement, pet sleeping, pet temperature, and the like. Periodic reports may be generated, and alarms may be configured for conditions that deviate from established trends, with automatic issuance of notifications to user terminals of any suitable type.

Desirable accessories for use with the system 105 include both pet-related accessories (e.g., pet doors, automated pet feeding apparatuses, automated pet watering apparatuses, pet monitoring cameras) and pet-independent accessories (e.g., lamps, home appliances, HVAC systems, entertainment systems, home alarm systems, garage doors, entry gates, premises monitoring cameras, garden sprinkler systems, outdoor lighting systems, remote automotive starting systems). In one embodiment, accessories may be operated by electronic pet tags as worn by pets in proximity to such accessories (e.g., pet access doors). In one embodiment, accessories may be selectively operated by electronic pet tags as worn by pets, depending upon condition of one or more sensors associated with such pet tags. For example, a dog may be kept in a fenced backyard without access to a garage via a pet door under normal circumstances, but if the dog barks or whines for a specified duration, then a sensor associated with a pet tag worn by the dog may identify same and enable opening of the pet door to provide the pet with access to an indoor space and avoid potential complaints from neighbors due to pet noise. In another example, a moisture sensor associated with an electronic pet tag may sense that an outdoor pet is getting wet (indicative of ambient rain) and therefore enable opening of a pet door to provide the pet with access to an indoor space.

In one embodiment, one or more electronic information device readers are operatively arranged to communicate with an implanted electronic information device (e.g., RFID tag) implanted in a pet, and to communicate information read from an implanted information device to a base station 80 as described herein or other network-based monitoring device (e.g., a home alarm monitoring system). An electronic information device reader (e.g., RFID transmitter adapted to stimulate resonant emission of information from an implanted passive RFID tag) may be positioned in proximity to a door or other point of access to a desired space. In one embodiment, such an electronic information device reader may be integrated with a doormat, doorbell, doorstop, or pet door. Such a reader may alternatively be integrated into to a ZDU or ZDU-like unit (as described herein) arranged for connection to an electrical outlet proximate to a point of access to a desired space. Movement of a pet containing the implanted electronic information device proximate to the electronic information device reader may cause the implanted electronic information device to emit a signal that may be read by the reader. Such information may be transmitted via communication network to a base station 80 or other network-based monitoring device (e.g., a home alarm monitoring system) to provide or supplement information regarding pet location, and to activate one or more alarms, initiate automatic notification procedures, and/or initiate tracking procedures.

In one embodiment, an electronic pet tag 50 as described herein may communicate via two-way RF with a remote controller useful to facilitate pet training. FIG. 11 is a schematic diagram showing various elements of a pet training system including an electronic remote controller 110 arranged for wireless communication with at least one electronic pet tag 50A, 50B. A remote controller may include a tag selector switch (not shown) to enable selective communication with multiple electronic pet tags. In one embodiment, a remote controller is adapted for use with only one electronic pet tag 50A at a time following establishment of synchronous communication therewith. The remote controller 110 may be used to control operation of an electronic pet tag as described herein (e.g., including bark control features, warning administration, correction administration) thereby affecting behavior of a pet wearing same.

FIG. 12 is a schematic diagram showing functional relationships between various elements of a remote controller 110 arranged for wireless communication with at least one electronic pet tag as described herein. The remote controller 110 includes a battery 112 or other charge storage element and at least one charging terminal 114 adapted to receive power from an external power source (not shown) and supply same to the battery 112. A power conditioning element 111 may provide power conditioning and/or regulating utility. Although only a microprocessor 120 is shown in direct electrical communication with the power conditioning element 111, it is to be appreciated that electrical power may be conducted to any of various electrically operated elements in the remote controller 110, whether or not through the microprocessor 120. Operating instructions for the microprocessor 120 may be updated via the memory reader 127 and/or RF receiver 122.

Multiple input elements 125A, 125B and at least one indicator 138 and/or display 136 are arranged to communicate with the microprocessor 120. At least one input element 125A, 125B may be operable to adjust warning and/or correction level or duration (e.g., using a slider, dial, or digital selector). At least one input element 125A, 125B may be arranged to enable selective administration of warning and/or correction signals by the electronic pet tag. At least one input element 125A, 125B may be arranged to generate a reward signal. An ultrasonic emitter 139 may be provided to selectively emit a signal causing animals (whether or not wearing an electronic pet tag 50) proximate to the remote controller 110 to disengage in unwanted or aggressive behavior (such as fighting). At least one indicator 138 (and/or the display 136) may be used to identify status or operating mode of the electronic pet tag, and/or warning or correction level. The display 136 may constitute a LCD display facilitating viewing of text, images, and/or video. The display 136 may further include a video decoder and/or video driver (not shown).

The remote controller 110 includes a RF transmitter 123 and a RF receiver 122 arranged to communicate with the microprocessor 120. A computer-readable or processor-readable instruction set (e.g., operating instructions) for execution by the microprocessor 120 may be stored on an internal memory element 126. A memory reader 127 or similar memory interface may be provided to enable communication with a removable memory element 127A (e.g., flash memory card or stick).

In one embodiment, the internal memory 126 and/or removable memory 127A include media-based training instructions, such as text instructions, audio instructions, and/or video instructions to enable a user to listen to perceive instructions and follow direction to training a pet. Such instructions may be embodied in a pre-loaded training guide. 126, 127A memory may further store digital entertainment media such as music files and the like. An audio decoder 130 (e.g., for decoding digital audio files in .MP3, .WAV, or similar formats) may be provided to facilitate playback from either memory element 126, 127A of files containing audio information. An AM/FM tuner 131 may also be provided. Outputs of the audio decoder 130 and AM/FM tuner 131 may be provided to an audio output element 132, which may provide amplification and/or signal conversion utility to provide audio-containing output signals to any of a wired port 133 or headphone jack, wireless port 134 (e.g., Bluetooth, zigBee, or the like), and/or an integral speaker 135. The audio output element thereby facilitates delivery to a user of an audible signal including pet training instructions upon playback of stored pet training instructions from either memory element 126, 127A.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Any of various elements or features recited herein are contemplated for use in combination with other features or elements disclosed herein, unless specified to the contrary. Correspondingly, the invention as hereinafter claimed is intended to be broadly construed and interpreted, as including all such variations, modifications and alternative embodiments, within its spirit and scope.

What is claimed is:

1. A directional zone defining unit adapted for use with an animal collar or tag that includes an infrared (IR) receiver, the directional zone defining unit comprising:
   a body structure comprising a stationary first body portion and a movable second body portion that is arranged to move relative to the stationary body portion;
   an IR transmitter retained by the second body portion, wherein while the first body portion is stationary, the second body portion is movable to allow directional aiming of an IR beam emitted from the IR transmitter to be received by the IR receiver; and
   at least one user input to enable a user to select different modes of operation of the zone defining unit relative to the animal collar or tag;
   wherein the second body portion is movable along two axes of rotation to allow directional aiming along two axes of the IR beam emitted from the IR transmitter.

2. The directional zone defining unit of claim 1, wherein the directional zone defining unit further comprises at least one electrical connector protruding from the first body portion wherein the at least one electrical connector is arranged to engage a corresponding receptacle for receiving electric power and for mounting the body structure.

3. The directional zone defining unit of claim 1, wherein the different modes of operation include at least one mode to cause the animal collar or tag to administer vibration, and at least one other mode to cause the animal collar or tag to administer electric shock.

4. The directional zone defining unit of claim 1, wherein the different modes of operation include (i) at least one mode to cause the animal collar or tag to administer any of a warning signal and a correction signal upon detection of sound or vibration emitted by an animal wearing the animal collar or tag, and (ii) at least one other mode to cause the animal collar or tag to neither administer a warning signal nor administer a correction signal upon detection of sound or vibration emitted by an animal wearing the animal collar or tag.

5. The directional zone defining unit of claim 1, wherein the IR beam defines a response zone, and wherein the different modes of operation includes at least one mode in which, upon detection of sound or vibration emitted by the animal wearing the animal collar or tag prior to entry of the animal collar or tag into the response zone, the animal collar or tag is caused to temporarily suspend administration of a warning signal or a correction signal after entry of the animal collar or tag into the response zone.

6. The directional zone defining unit of claim 1, wherein the directional zone defining unit further comprises a night light operatively coupled to the body structure and arranged to automatically light an area proximate to the directional zone defining unit during low ambient light conditions.

7. An animal containment system comprising the directional zone defining unit of claim 1 and an animal collar or tag coupleable to an animal, the animal collar or tag comprising:
   a power storage element;
   a microprocessor arranged to receive power supplied by the power storage element; and
   an infrared (IR) receiver operatively coupled with the microprocessor, wherein the infrared receiver is adapted to receive an IR beam output by the directional zone defining unit.

8. The animal containment system according to claim 7, wherein the animal collar or tag further comprises at least one sensor adapted to sense a condition correlative of movement or stasis of the animal and generate a sensor output signal, wherein the animal collar or tag is adapted to automatically alter operating status to reduce power consumption of the animal collar or tag responsive to receipt or non-receipt of a sensor output signal correlative of movement or stasis of the animal.

9. The animal containment system according to claim 8, wherein the altered operating status includes reduction in communication frequency between the animal collar or tag and a radio frequency (RF) base station.

10. The animal containment system according to claim 8, wherein the at least one sensor is adapted to sense at least one of movement, acceleration, and noise.

11. The animal containment system according to claim 7, wherein the animal collar or tag further comprises at least one of: (i) a warning signal generating element adapted to generate a warning signal perceptible by the animal when wearing the animal collar or tag, and (ii) a correction signal generating element adapted to generate a correction signal perceptible by the animal when wearing the animal collar or tag.

12. The animal containment system according to claim 7, wherein the animal collar or tag further comprises at least one sensor adapted to sense a condition indicative of barking or other vocalization by the animal when wearing the animal collar or tag and adapted to output a detection signal, wherein at least one of (a) a warning signal perceptible by the animal and (b) a correction signal perceptible by the animal is administered responsive to the detection signal.

13. The animal containment system according to claim 7, wherein the animal collar or tag further comprises a global positioning system (GPS) communication element, wherein operation of the GPS communication element is responsive to receipt or non-receipt of a radio frequency (RF) signal indicative of proximity of the animal to a RF base station.

14. The animal containment system according to claim 7, wherein the animal collar or tag further comprises a plurality of sensors of different types adapted to sense conditions indicative of barking or other vocalization by the animal when wearing the animal collar or tag, wherein an output signal of one sensor of the plurality of sensors is used in combination with an output signal of another sensor of the plurality of sensors to determine a condition of barking or other vocalization by the animal.

15. The animal containment system according to claim 7, wherein the animal collar or tag further comprises a plurality of sensors of different types adapted to sense conditions indicative of barking or other vocalization by the animal when wearing the animal collar or tag, wherein an output signal of one sensor of the plurality of sensors is used to affect at least one of operation or output signal processing of another sensor of the plurality of sensors to determine a condition of barking or other vocalization by the animal.

16. The animal containment system according to claim 7, wherein:
the animal collar or tag further comprises a mobile radio frequency (RF) transmitter and a mobile RF receiver operatively coupled with the microprocessor; and
the animal containment system further comprises an RF base station adapted for RF wireless communication with the animal collar or tag; and the RF base station comprises (i) base station microprocessor and (ii) a base station RF receiver and a base station RF transmitter operatively coupled with the base station microprocessor and adapted for wireless communication with the mobile RF transmitter and the mobile RF receiver, respectively, wherein the base station is adapted to generate an alarm signal responsive to receipt or non-receipt of a RF signal indicative of at least one of: condition of the animal, behavior of the animal, and proximity of the animal to the base station.

17. The animal containment system according to claim 16, wherein the base station further comprises a network communication port arranged to automatically communicate with at least one network communication terminal responsive to the receipt or non-receipt by the base station of the RF signal indicative of at least one of: condition of the animal, behavior of the animal, and proximity of the animal to the base station.

18. The animal containment system according to claim 16, wherein the base station further comprises at least one of a sound generating element and a light generating element adapted to generate a human-perceptible signal following the receipt or non-receipt by the base station of the RF signal indicative of at least one of: condition of the animal, behavior of the animal, and proximity of the animal to the base station.

19. The animal containment system according to claim 16, wherein the base station further comprises a memory element adapted to store information received from at least one of the base station RF receiver and a network communication port of the base station.

20. The animal containment system according to claim 16, wherein the base station is adapted to communicate wirelessly with at least one of an animal-related accessory and an animal-independent accessory.

21. The animal containment system according to claim 16, wherein the base station further comprises a network communication port, and wherein the base station is adapted to communicate with a remote electronic terminal via the network communication port and a communication network.

22. The animal containment system according to claim 16, wherein the base station is adapted to transmit a RF signal to an animal collar or tag wearable by an animal to update operating instructions for the animal collar or tag.

23. The animal containment system according to claim 22, wherein the operating instructions comprise at least one mode of operation involving sensing of a condition indicative of barking or other vocalization by the animal when wearing the animal collar or tag to generate a detection signal, and are responsive to the detection signal administering at least one of (a) a warning signal perceptible by the animal and (b) a correction signal perceptible by the animal.

* * * * *